United States Patent [19]
Burgio

[11] Patent Number: 4,693,219
[45] Date of Patent: Sep. 15, 1987

[54] INTERNAL COMBUSTION ENGINE WITH DIRECT FUEL INJECTION

[75] Inventor: Antonio Burgio, Moncalieri, Italy

[73] Assignee: Fiat Auto S.P.A., Turin, Italy

[21] Appl. No.: 598,943

[22] Filed: Apr. 11, 1984

[30] Foreign Application Priority Data

Apr. 11, 1983 [IT] Italy ................. 67393 A/83

[51] Int. Cl.³ ............................................. F02B 23/06
[52] U.S. Cl. .................................... 123/276; 123/279
[58] Field of Search ................... 123/276, 279, 261

[56] References Cited

U.S. PATENT DOCUMENTS

| | | | |
|---|---|---|---|
| 2,622,570 | 12/1952 | Nallinger | 123/276 |
| 2,975,773 | 3/1961 | Meurer | 123/276 |
| 3,085,557 | 4/1963 | Meurer | 123/276 |
| 3,945,351 | 3/1976 | Kimbara et al. | 123/279 |
| 3,954,089 | 5/1976 | Hardesty et al. | 123/276 |

FOREIGN PATENT DOCUMENTS

| | | | |
|---|---|---|---|
| 171087 | 10/1951 | Austria | 123/276 |
| 1127664 | 4/1962 | Fed. Rep. of Germany | 123/261 |
| 899973 | 6/1945 | France | 123/276 |
| 585801 | 2/1947 | United Kingdom | 123/276 |
| 891738 | 3/1962 | United Kingdom | 123/261 |

Primary Examiner—Andrew M. Dolinar
Attorney, Agent, or Firm—Sughrue, Mion, Zinn, Macpeak & Seas

[57] ABSTRACT

An internal combustion engine with direct fuel injection includes at least one cylinder in which is slidable a piston the crown of which has a cavity constituting at least part of the combustion chamber of the cylinder, and a fuel injector with a nozzle having several holes facing the cavity in the piston and oriented so that its axis is at an angle of between 15° and 30° to the axis of the cylinder. The cavity in the crown of the piston has an inclined flat base wall which is oriented perpendicularly to the axis of the injector, and a mouth which is centered on the axis of the cylinder.

5 Claims, 3 Drawing Figures

INTERNAL COMBUSTION ENGINE WITH DIRECT FUEL INJECTION

The present invention relates to an internal combustion engine, particularly a diesel engine, with direct fuel injection, including at least one cylinder in which is movable a piston the crown of which has a cavity constituting at least part of the combustion chamber of the cylinder, and a fuel injector with a nozzle having several holes facing the cavity in the piston and oriented with its axis at an angle of between substantially 15° and 30° to the axis of the cylinder.

The object of the present invention is to provide an internal combustion engine of the type specified above which is arranged to ensure better penetration and distribution of the fuel in the cavity in the piston during the fuel injection, so as to obtain a more gradual and regular combustion in use.

According to the invention, this object is achieved by virtue of the fact that the cavity in the crown of the piston has an inclined flat base wall which is oriented perpendicular to the axis of the injector, and a mouth which is centred on the axis of the cylinder.

Preferably, the base wall of the cavity in the crown of the piston is substantially elliptical in plan with its centre located on an extension of the axis of the injector when the piston is substantially in its top dead centre position.

Preferably, the nozzle of the injector has four holes located and oriented so as to direct their respective jets of fuel into zones of the piston cavity adjacent the base wall and substantially equiangularly spaced about the axis of the injector.

The invention will now be described in detail with reference to the appended drawings, provided purely by way of non-limiting example, in which.

Figure 1:
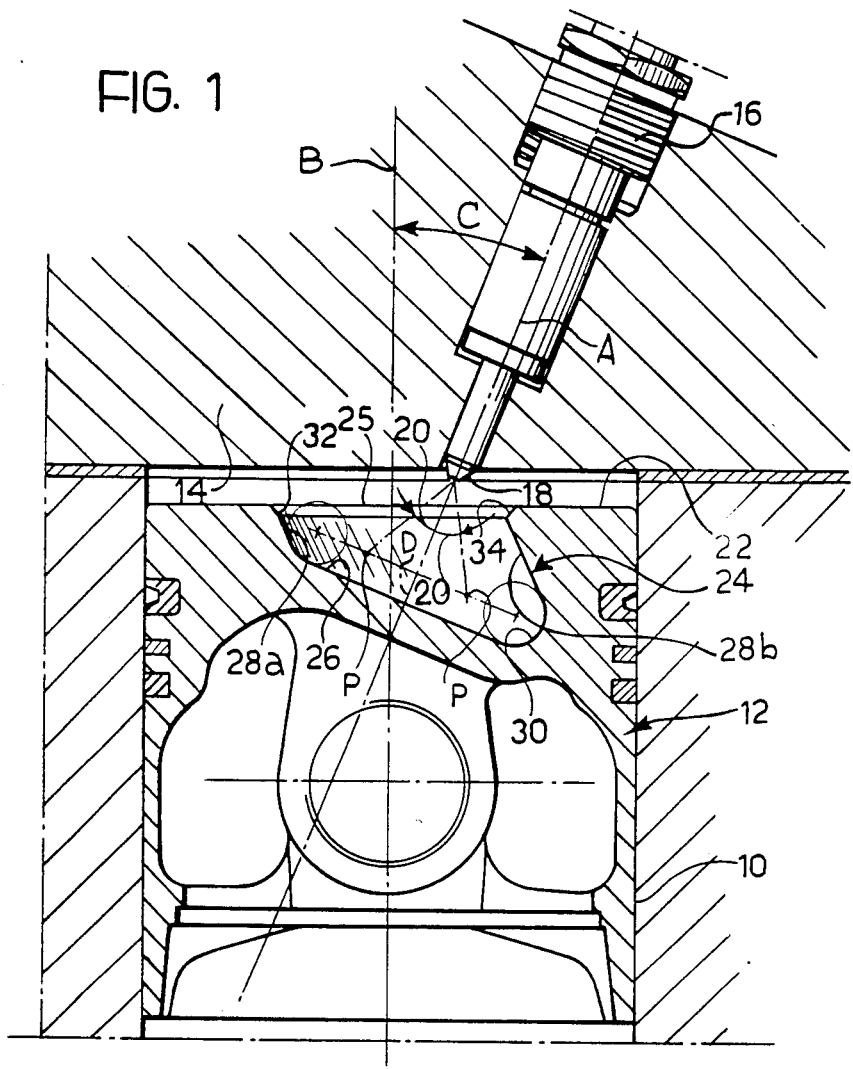
FIG. 1 is a schematic, partially-sectioned view of part of an internal combustion engine according to the invention.

In the drawings, a cylinder of an internal combustion engine for a motor vehicle with direct injection, indicated 10, has a piston 12 slidable therein.

In the head 14 of the cylinder 10 is inserted a fuel injector 16 having a nozzle 18 facing the cavity of the cylinder 10 and provided in known manner with four outlet holes for respective angularly-spaced fuel jets 20, indicated in outline in FIG. 1.

The axis A of the injector 16 is at an angle C of between 15° and 30°, normally 22°, to the axis B of the cylinder 10.

In the crown 22 of the piston 12 is formed a cavity 24 intended to constitute the major part of the combustion chamber of the cylinder 10.

According to the invention, the cavity 24 has a mouth 25 centred on the axis B of the cylinder 10 and a flat base wall 26 inclined towards the injector 16 at an angle, relative to the surface of the crown 22, corresponding to the angle C between the axes A and B of the injector 16 and the cylinder 10 respectively. In other words, the base wall 26 is perpendicular to the axis A of the injector 26.

Figure 2:
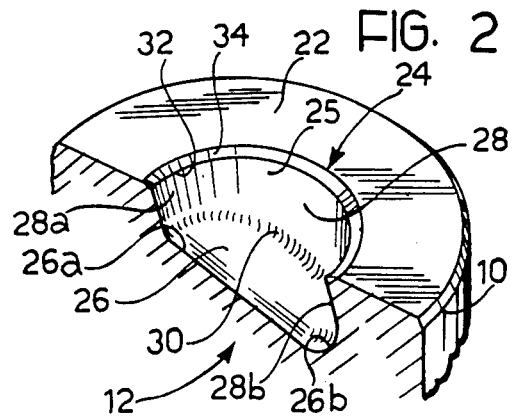
FIG. 2 is a perspective sectional view of a piston of the engine.

This base wall 26 is preferably substantially elliptical in plan (FIG. 2), having its centre D located on an extension of the axis A of the injector 16 when the piston 12 is substantially in its top dead centre position.

Figure 3:
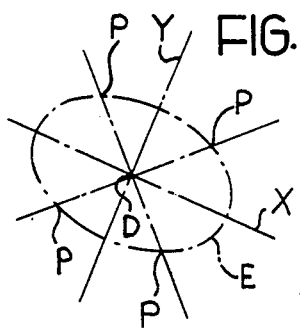
FIG. 3 is a schematic view illustrating the distribution of the fuel jets within the cavity of the piston.

As is seen in FIGS. 1 and 3, the arrangement of the cavity 24 and the nozzle 18 of the injector 16 is such that, at the moment of injection, the fuel jets 20 are directed towards respective points P on an ellipse E of a form corresponding to that of the base wall 26, these points P being substantially equiangularly spaced relative to the axes X—Y of the ellipse E.

The side wall 28 of the cavity 24, in correspondence with the uppermost end 26a and the lowermost end 26b of the base wall 26, has surfaces 28a, 28b one of which is inclined at an obtuse angle and the other at an acute angle to the base wall 26. It should be noted that this base wall 26 is connected to the side wall 28 by an annular rounded surface 30.

The edge 32 of the mouth 25 of the cavity 24 is connected to the surface of the crown 22 of the piston 12 by an annular bevelled surface 34 usually forming an angle of 45° with the crown 22.

It will be clear from the above that the arrangement of the engine according to the invention offers the advantage of having a combustion chamber centred on the cylinder 20 and, at the same time, fuel injection which is symmetrical about the axis A of the injector 16. It should be noted that the same effect could be achieved by using an injector with a nozzle having a single pair of holes located in diametrally opposite positions instead of four holes as in the example illustrated.

Naturally the constructional details and the embodiments may be varied widely with respect to that described and illustrated, without thereby departing from the scope of the invention.

What is claimed is:

1. An internal combustion engine, particularly a diesel engine with direct fuel injection, including at least one cylinder having a combustion chamber, a piston moveable within the cylinder and having a crown, a cavity formed in the piston crown and constituting at least part of the combustion chamber of the cylinder, and a fuel injector having a nozzle provided with a plurality of spraying holes facing the cavity in the piston, the fuel injector having an axis oriented at an angle substantially between 15° and 30° to the axis of the cylinder and the cavity in the crown of the piston having an inclined flat substantially elliptical base wall which is oriented perpendicular to the axis of the injector with the center of said base wall being located on an extension of the axis of the injector when the piston is substantially in its top dead center position and a mouth which is centered on the axis of the cylinder.

2. An engine as set forth in claim 1 wherein the nozzle of the injector has four holes located and oriented so as to direct their respective jets of fuel towards points in the cavity of the piston substantially equi-angularly spaced about the axis of the injector.

3. An engine as set forth in claim 1 wherein the base wall of the cavity of the piston has uppermost and lowermost ends, said cavity having a side wall provided with respective inclined surfaces at the uppermost and lowermost ends of the base wall, one of which is at an obtuse angle and the other at an acute angle to the base wall.

4. An engine as set forth in claim 3 wherein rounded surfaces connect the base wall of the cavity of the piston to the side wall thereof.

5. An engine as set forth in claim 1 wherein an annular beveled surface connects the edge of the mouth of the cavity of the piston to the surface of the crown of said piston.

* * * * *